United States Patent
Provvedi et al.

(10) Patent No.: US 8,611,301 B2
(45) Date of Patent: Dec. 17, 2013

(54) METHOD OF INDICATING MOBILE STATION CAPABILITY TO A NETWORK

(75) Inventors: Leonardo Provvedi, Eastleigh (GB); Eswar Vutukuri, Hedge End (GB)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 532 days.

(21) Appl. No.: 12/226,186

(22) PCT Filed: Mar. 19, 2007

(86) PCT No.: PCT/GB2007/050130
§ 371 (c)(1),
(2), (4) Date: Apr. 28, 2009

(87) PCT Pub. No.: WO2007/116224
PCT Pub. Date: Oct. 18, 2007

(65) Prior Publication Data
US 2009/0296665 A1 Dec. 3, 2009

(30) Foreign Application Priority Data
Apr. 12, 2006 (GB) .................................. 0607362.1
Sep. 28, 2006 (GB) .................................. 0619086.2

(51) Int. Cl.
*H04W 4/00* (2009.01)

(52) U.S. Cl.
USPC .......................................... 370/330; 370/329

(58) Field of Classification Search
USPC .............. 370/235, 237, 229, 242, 252, 230.1, 370/240, 254, 250, 253, 244, 241, 320, 330, 370/342, 335, 347, 328, 338, 352, 356, 370/395.21, 349, 389, 310, 401, 419, 412, 370/411, 420, 414.2, 434, 409, 468; 455/127.5, 411, 435.1, 456.1, 450, 455/426.1, 101, 552.1, 562.1, 561; 709/223, 224, 227

See application file for complete search history.

(56) References Cited

U.S. PATENT DOCUMENTS 5,513,379 A    4/1996   Benveniste et al.
8,031,688 B2 * 10/2011  Papasakellariou et al. ... 370/344
(Continued)

FOREIGN PATENT DOCUMENTS

EP   1 261 227 A1   5/2001
GB   2437130        10/2007
(Continued)

OTHER PUBLICATIONS

3rd Generation Partnership Project;Technical Specification Group GSM/EDGE Radio Access Network; Multiplexing and multiple access on the radio path (Release 6); 3GGP TS 45.002 V6.12.0; Nov. 2005; pp. 1-92.

(Continued)

*Primary Examiner* — Abdullah Riyami
(74) *Attorney, Agent, or Firm* — Staas & Halsey LLP

(57) ABSTRACT

An indication is sent from a mobile station to a network regarding the capability of the mobile station to receive or transmit on two or more carriers simultaneously. The network determines an ideal multi-carrier multi-slot capability of the mobile station from an existing capability indication for single carrier transmission mode of the mobile station; and the mobile station sends in an additional field an indication in respect of a reduction in number of time slots from the ideal multi-carrier multi-slot capability determined by the network.

4 Claims, 2 Drawing Sheets

(56) References Cited

U.S. PATENT DOCUMENTS

| | | | |
|---|---|---|---|
| 8,412,209 B2* | 4/2013 | Whinnett et al. | 455/450 |
| 2001/0036194 A1* | 11/2001 | Bauer et al. | 370/412 |
| 2003/0118043 A1* | 6/2003 | Sebire et al. | 370/412 |
| 2004/0100940 A1* | 5/2004 | Kuure et al. | 370/349 |
| 2004/0151156 A1* | 8/2004 | Noel et al. | 370/349 |
| 2006/0221894 A1* | 10/2006 | Casaccia et al. | 370/328 |
| 2007/0019575 A1* | 1/2007 | Shaheen | 370/310 |
| 2008/0305745 A1* | 12/2008 | Zhang et al. | 455/67.11 |
| 2008/0311919 A1* | 12/2008 | Whinnett et al. | 455/447 |
| 2009/0006925 A1* | 1/2009 | Pan | 714/758 |
| 2009/0010240 A1* | 1/2009 | Papasakellariou et al. | 370/344 |
| 2009/0163158 A1* | 6/2009 | Chitrapu et al. | 455/127.5 |
| 2009/0268831 A1* | 10/2009 | Onggosanusi et al. | 375/260 |
| 2010/0098012 A1* | 4/2010 | Bala et al. | 370/329 |
| 2010/0118817 A1* | 5/2010 | Damnjanovic et al. | 370/329 |
| 2010/0130218 A1* | 5/2010 | Zhang et al. | 455/450 |
| 2010/0227569 A1* | 9/2010 | Bala et al. | 455/73 |
| 2011/0002322 A1* | 1/2011 | Kim et al. | 370/344 |
| 2011/0141941 A1* | 6/2011 | Lee et al. | 370/252 |
| 2011/0142009 A1* | 6/2011 | Lindoff et al. | 370/332 |
| 2011/0188594 A1* | 8/2011 | Kim et al. | 375/260 |
| 2011/0274099 A1* | 11/2011 | Kwon et al. | 370/338 |
| 2011/0280203 A1* | 11/2011 | Han et al. | 370/329 |
| 2012/0093097 A1* | 4/2012 | Che et al. | 370/329 |

FOREIGN PATENT DOCUMENTS

| | | |
|---|---|---|
| RU | 2 154 901 C2 | 8/2000 |
| RU | 2 207 723 C1 | 6/2003 |
| WO | 99/63774 | 12/1999 |
| WO | 01/58095 A1 | 8/2001 |
| WO | 02/093968 A1 | 11/2002 |
| WO | 03/045083 A1 | 5/2003 |

OTHER PUBLICATIONS

3rd Generation Partnership Project; Technical Specification Group Core Network and Terminals; Mobile radio interface Layer 3 specification; Core network protocols; Stage 3 (Release 6); 3GGP TS 24,008 V6.11.0; Dec. 2005; pp. 1-526.

3rd Generation Partnership Project; Technical Specification Group GSM/EDGE, Radio Access Network; Feasibility study for evolved GSM/EDGE Radio Access Network (GERAN) (Release 7); 3GPP TR 45.912 V2.0.1; 2004, pp. 1-475.

F. Noel; "Higher Data Rates in GSM/EDGE with Multicarrier"; Master's Thesis, Chalmers University of Technology Goteborg, Sweden, Apr. 2001; pp. 1-61, printed on Oct. 10, 2008 from db.s2.chalmers.se/download/masters/master_EX024_2001.pdf.

International Search Report for Application No. PCT/GB2007/050130; mailed Jun. 20, 2007.

3GPP TS 25.306 V7.0.0; Technical Specification Group Radio Access Network; UE Radio Access capabilities (Release7), Mar. 2006; pp. 1-36.

* cited by examiner

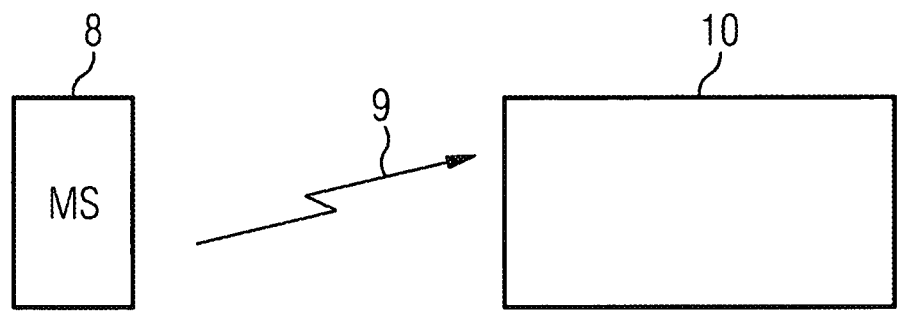
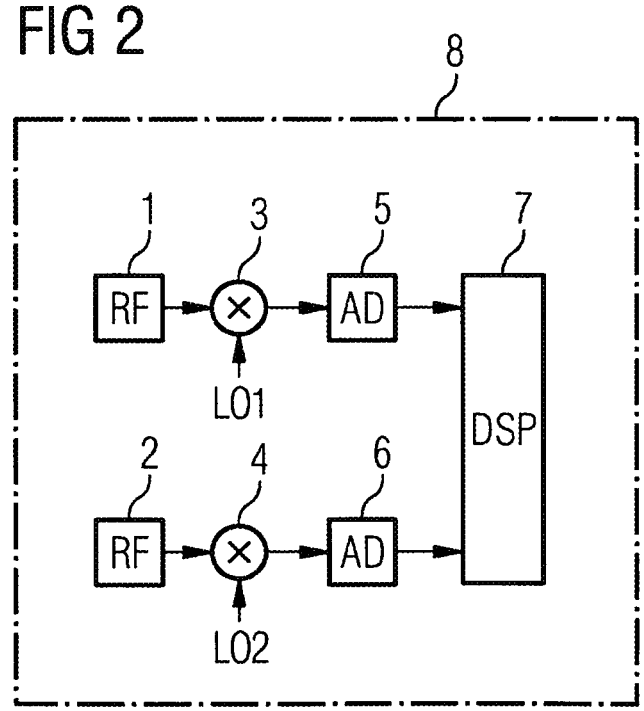

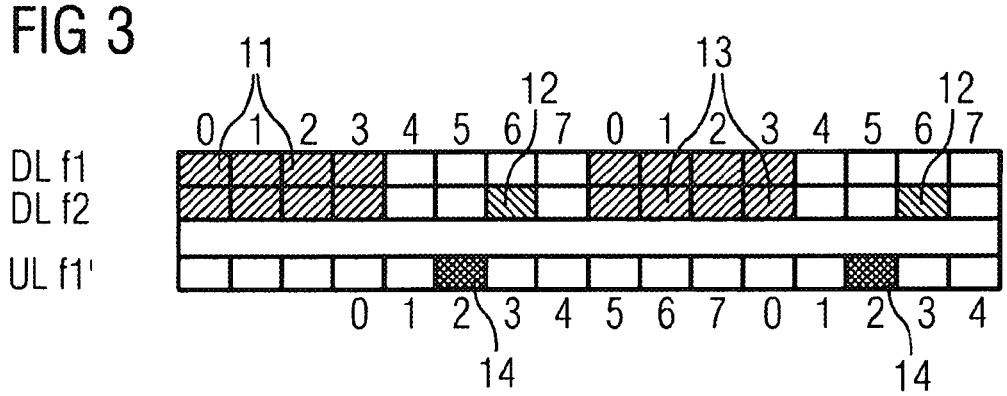
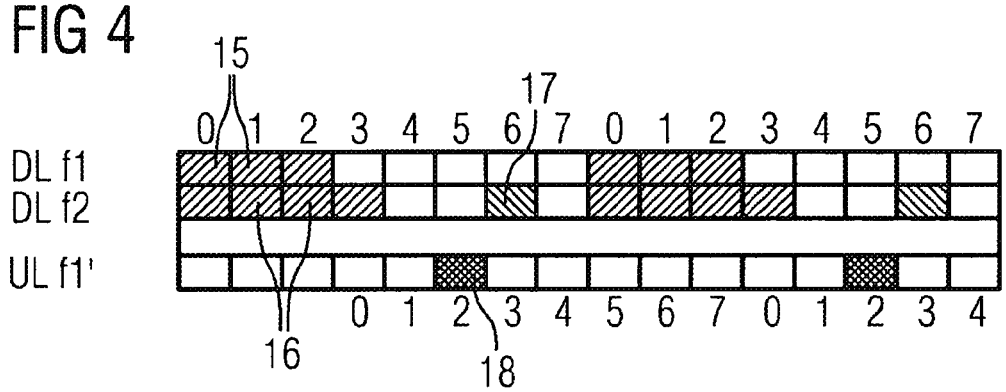

METHOD OF INDICATING MOBILE STATION CAPABILITY TO A NETWORK

CROSS REFERENCE TO RELATED APPLICATIONS

This application is based on and hereby claims priority to United Kingdom Application No. 0607362.1 filed on Apr. 12, 2006 and United Kingdom Application No. 0619086.2 filed on Sep. 28, 2006, the contents of which are hereby incorporated by reference.

BACKGROUND

Downlink dual carrier transmission is being developed in the $3^{rd}$ generation partnership project (3GPP) as part of global system for mobile communications (GSM) enhanced data rates for GSM evolution (EDGE) Radio Access Network (GERAN) specifications in Release 7. With the additional capabilities of the dual carrier mobiles, the support of the new multi-slot capabilities has to be indicated by the mobile station (MS) in the Classmark 3 and MS radio access capability (RAC) as set out in 3GPP TS 24.008. As there are already quite a large number of bits in the Classmark 3 and MS RAC, increasing the size further by a large number of bits is undesirable. A large number of bits in those messages would delay the network attach procedure for the MS. However, some flexibility is needed in the MS implementation to allow early introduction of the feature in the market and this needs a number of MS classes to be allowed with varying multi-slot capabilities. Hence any new indication needs to be done in the most efficient possible way.

SUMMARY

In accordance with a first aspect, a method of indicating multi-slot capabilities of a multi-carrier mobile station to a network includes sending an indication from the mobile station to the network of the capability of the mobile station to receive, or transmit, on two or more carriers simultaneously.

The method provides a way to use as few bits as possible to indicate the multi-(dual) carrier capabilities of the MS to the network. This allows greater flexibility for implementation of the dual carrier MS since a large number of downlink multi-slot capabilities can be signalled by an MS belonging to a given single carrier multi-slot class. This eases the implementation options for the MS manufacturers.

The network may determine an ideal multi-carrier multi-slot capability of the mobile station from an existing capability indication for single carrier mode of the mobile station.

The mobile station may send in an additional field an indication in respect of a reduction in number of time slots from the ideal multi-carrier multi-slot capability.

The mobile station may be GSM EDGE capable.

The indication of the multi-carrier capabilities and the indication of reduction in time slots from ideal multi carrier multi slot capability may be done using the mobile station radio access capability or Classmark 3 information elements.

In one embodiment, the mobile station sends the indication in respect of a reduction in the number of time slots from the ideal multi-carrier multi-slot capability determined by the network in separate additional fields for each of general packet radio service (GPRS) and enhanced GPRS modes, which need different modulations.

BRIEF DESCRIPTION OF THE DRAWINGS

An example of a method of indicating multi-slot capabilities of a multi-carrier mobile station to a network will now be described These and other aspects and advantages will become more apparent and more readily appreciated from the following description of the exemplary embodiments, taken in conjunction with the accompanying drawings of which:

FIG. 1 is a block diagram illustrating a system in which the method described below is applied;

FIG. 2 is a block diagram of a mobile station in the system of FIG. 1;

FIG. 3 is a data transmission diagram illustrating a first example of timeslot allocation using the method described below; and FIG. 4 is a data transmission diagram illustrating a second example of timeslot allocation using the method described below.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

FIG. 1 shows a system in which the method can be applied. A mobile station 8 communicates 9 with a network 10. A downlink dual carrier MS is expected to be capable of receiving on two downlink carriers simultaneously. In GSM a carrier is the smallest chunk of radio frequency bandwidth which the MS, or the network, is allowed to use to communicate. It is also assumed that the MS is capable of monitoring neighbor cell signal strength in parallel to reception of data whenever possible. The radio frequency (RF) architecture assumed for the receiver in such an MS is as shown in FIG. 2. This illustration from 3GPP TR 45.912 shows RF architecture for downlink dual carrier MS as a simple extension of that of the single carrier MS. In the MS of FIG. 2 individual RF inputs 1, 2 are combined with the signals generated by the respective local oscillators LO1, LO2 in multipliers 3, 4 and converted to digital signals in respective analogue to digital converters 5, 6. The digital signals are input to a digital signal processor 7 for further base-band processing.

The base-band module of the MS is a single unit common for both RF receive chains. This gives rise to the possibility that the base-band processing power at the MS side could now become a bottleneck for the total number of receivable timeslots. Neighbor cell monitoring on the other hand takes relatively little base-band processing power. It is assumed that either of the local oscillators LO1, LO2 is capable of switching to transmit mode when necessary.

Although dual carrier mobiles are predominantly expected to be of Type 1 (i.e. they cannot transmit and receive simultaneously, as defined in 3GPP TS 45.002), the method also applies to Type 2 mobiles, which are capable of simultaneous transmission and reception.

One option to encode the multi-slot capabilities of a MS that supports downlink dual carrier is to simply double its downlink multi-slot capabilities. The advantage of this solution is that it needs just a single bit in the Classmark 3/MS RAC, indicating downlink dual carrier capability of the MS, which make this solution very attractive.

A dual carrier mobile still needs to indicate its multi-slot class capability when operating as a single carrier mobile, as it could be in a network that does not support dual carrier, for example in a network of Release 6 or earlier. In 3GPP technical specification (TS) 45.002, the multi-slot class is defined in the following way:

Multislot class: $RX+TX=Sum$ where:

RX=maximum number of receive timeslots (TS) that the MS can use per time division multiple access (TDMA) frame;

TX=maximum number of transmit timeslots that the MS can use per TDMA frame;

Sum=total number of uplink and downlink TS that can actually be used by the MS per TDMA frame.

For dual carrier, there is currently no intention to define new multi-slot classes, but to derive the multi-slot capabilities from the single carrier multi-slot. For this purpose the ideal number of timeslots that an MS is able to receive data on in the dual carrier mode is fixed for each single carrier multi-slot class that is indicated by the MS. This value is double the total number of timeslots in single carrier mode for most of the multi-slot classes. However, more than double the number of timeslots may also be possible in case of some multi-slot classes and this value is fixed in the standard. Hence, the ideal dual carrier multi-slot capability of a dual carrier mobile could be derived by the network just by knowing its equivalent capability indicated for a single carrier network. The RF (turn around parameters) of the dual carrier MS are also derived from the multi-slot class indicated by the MS to the network. The MS then needs only to indicate whether it is capable of dual-carrier reception or not. This then needs a single bit in the Classmark 3/MSRAC of the MS. The problem with the simple extension described is that the implementation options for the dual carrier MS are very limited. Although the RF capabilities double, the base-band capabilities need not be double and thus the MS might not be able to support double, or more than double in some cases, the number of timeslots in single carrier mode. When a dual carrier MS is developed, if the above method of capability indication is adopted, the MS manufacturers are forced to double the base-band capabilities as well as RF capabilities at the same time and this is expected to delay the introduction of the feature in the market. Hence, a flexibility in number of downlink timeslots that could be supported by a dual carrier MS is highly desirable.

For each multi-slot class, allowing such flexibility and encoding all possible combinations depending on the base-band capabilities of the MS leads to a very large number of different multi-slot classes and this makes it extremely difficult for coding the capability as a large number of bits in the Classmark are needed to indicate the correct capability of the MS explicitly.

To overcome the issues highlighted, a further feature is to provide an additional indication of the base-band capabilities of the MS. This can be done simply by indicating the number of timeslots that the maximum downlink dual carrier capability should be reduced by.

FIG. 3 shows an example of a class 12 mobile station capable of downlink dual carrier. Downlink carrier f1 was assigned four receive timeslots 11 out of eight possible receive time slots and downlink f2 also was assigned four receive timeslots 13. In addition, downlink f2 uses one slot 12 for neighbor cell monitoring. In uplink carrier f1', one slot in eight is used as a transmit timeslot 14 and is chosen so as not to coincide with the downlink timeslots used 11, 12, 13—Type 1 operation.

The MS shown in FIG. 4 is also a class 12 MS capable of dual carrier as is the one shown in FIG. 3 with a reduction of one timeslot because of base-band processing power restrictions. Thus, the downlink carrier f1 was assigned one timeslot less than the downlink carrier f2. The reduction could be done on any downlink carrier as long as the base-band processing requirements are same for the timeslots on either carriers.

Since there are only 8 timeslots in a TDMA frame for GSM system, the maximum reduction in the number of timeslots due to restrictions in baseband capabilities ranges from 0—meaning no restrictions from base-band perspective—to 7. This can be done using a 3-bit field to indicate the reduction in the number of possible receive timeslots due to limited base-band resources. As an optional enhancement, the indication can be done independently for GPRS and EGPRS. However, a 3 bit field is not necessary in all cases since all possible reductions may not necessarily be defined. Hence a reduction of the number of bits needed to signal the base-band capability is possible. For this purpose, the reduction field's meaning can be tied to the indicated multi-slot class. Greater reduction is needed when a greater number of time-slots are supported by the MS. Thus, by combining the meaning of the reduction field to the indicated multi-slot class of the MS, it is possible to cover a large number of meaningful multi-slot reductions with only 2 bits. Thus, enough flexibility is provided while keeping the multi-slot class reduction field small enough, so that the number of bits in the Classmark 3/MSRAC is not increased too much.

This reduction is intended per assignment. For example, in the case of FIG. 4, illustrating a case not covered by simple extension of multi-slot classes, the network assigns three timeslots 15 as receive timeslots on carrier f1; four timeslots 16 as receive timeslots on carrier f2, with one timeslot 17 for neighbor cell monitoring; one slot on uplink f1 is a transmit timeslot 18; and this case still satisfies the multi-slot class capabilities of the mobile.

As a further example, for the case where the MS is of class 12 and the required reduction is of 3 timeslots, then, the network either assigns 4 downlink timeslots on f1 and 1 on f2, or 3 downlink timeslots on f1 and 2 on f2, or 2 downlink timeslots on f1 and 3 on f2 or 1 downlink timeslots on f1 and 4 on f2. The reduction in the number of time slots from the ideal multi-carrier multi-slot capability in the downlink may be because of limited base-band processing power of the mobile station, or heat dissipation problems.

There are a number of advantages of the method. These include the fact that very few bits are needed in the Classmark 3/MS RAC, i.e. only 3 or 4 additional bits are needed. Also, the method reuses all the optimizations already done in coding the existing multi-slot classes because of the simple extension of existing multi-slot class indication. Furthermore, the method is flexible enough to apply to future systems in the sense that if an uplink enhancement like dual carrier on uplink is standardized in future, the same technique can be used to code all the uplink multi-slot classes by adding one bit to signal support for dual carrier in the uplink and a 3 bit field to indicate the reduction in number of timeslots in uplink from maximum dual carrier uplink capability.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of indicating multi-slot capabilities of a multi-carrier mobile station to a network, comprising:

sending an indication from the mobile station to the network regarding whether the mobile station is able to receive on two or more carriers simultaneously; and determining, by the network, an ideal multi-carrier multi-slot capability of the mobile station only from an existing capability indication for a single carrier mode of the mobile station, wherein the mobile station is capable of sending in an additional field an indication in respect of a reduction in number of time slots from ideal multi-carrier multi-slot capability.

2. A method according to claim 1, wherein the mobile station is capable of global system for mobile communications enhanced data rates for global system for mobile communications evolution.

3. A method according to claim 2, wherein the indication of multi-carrier capability and the indication of the reduction in time slots from ideal multi carrier multi slot capability uses the mobile station radio access capability or Classmark 3 information elements.

4. A method according to claim 1, wherein said sending of the indication of the reduction in the number of time slots uses another additional field separate from the additional field used to provide the indication of the ideal multi-carrier multi-slot capability determined by the network for enhanced general packet radio service and general packet radio service modes.

* * * * *